(12) United States Patent
Yakabe et al.

(10) Patent No.: US 12,248,183 B2
(45) Date of Patent: Mar. 11, 2025

(54) OPTICAL CONNECTOR AND OPTICAL CONNECTION STRUCTURE

(71) Applicants: SUMITOMO ELECTRIC INDUSTRIES, LTD., Osaka (JP); NIPPON TSUSHIN DENZAI CO., LTD., Komaki (JP)

(72) Inventors: Sho Yakabe, Osaka (JP); Motoyoshi Kimura, Komaki (JP)

(73) Assignees: SUMITOMO ELECTRIC INDUSTRIES, LTD., Osaka (JP); NIPPON TSUSHIN DENZAI CO., LTD., Komaki (JP)

( * ) Notice: Subject to any disclaimer, the term of this patent is extended or adjusted under 35 U.S.C. 154(b) by 238 days.

(21) Appl. No.: 18/070,588

(22) Filed: Nov. 29, 2022

(65) Prior Publication Data

US 2023/0176292 A1    Jun. 8, 2023

(30) Foreign Application Priority Data

Dec. 7, 2021 (JP) ................................. 2021-198319

(51) Int. Cl.
*G02B 6/38* (2006.01)

(52) U.S. Cl.
CPC .......... *G02B 6/3825* (2013.01); *G02B 6/3826* (2013.01); *G02B 6/3869* (2013.01)

(58) Field of Classification Search
CPC ..... G02B 6/3825; G02B 6/3851; G02B 6/3873
See application file for complete search history.

(56) References Cited

U.S. PATENT DOCUMENTS

| 2020/0110225 | A1* | 4/2020 | Mathai | G02B 6/3839 |
| 2020/0371298 | A1 | 11/2020 | Nakama et al. | |
| 2023/0141449 | A1* | 5/2023 | Yakabe | G02B 6/3874 |
| | | | | 385/79 |
| 2023/0296850 | A1* | 9/2023 | Yakabe | G02B 6/3885 |
| | | | | 385/56 |
| 2023/0367081 | A1* | 11/2023 | Uehara | G02B 6/3821 |

FOREIGN PATENT DOCUMENTS

| JP | 2015-203858 A | 11/2015 |
| JP | 2019-090974 A | 6/2019 |
| WO | 2021/192746 A1 | 9/2021 |
| WO | 2021/205754 A1 | 10/2021 |

* cited by examiner

*Primary Examiner* — Michael Stahl
(74) *Attorney, Agent, or Firm* — Oliff PLC

(57) ABSTRACT

An optical connector includes a ferrule accommodating an optical fiber, and a housing covering an outer circumference of the ferrule. An outer circumferential surface of the ferrule has a recessed part or a projecting part for positioning extending in an optical axis direction of the optical fiber. The housing has a slit extending in the optical axis direction at a position corresponding to the recessed part or the projecting part of the ferrule.

7 Claims, 8 Drawing Sheets

OPTICAL CONNECTOR AND OPTICAL CONNECTION STRUCTURE

CROSS-REFERENCE TO RELATED APPLICATIONS

This application claims the benefit of priority from Japanese Patent Application No. 2021-198319, filed on Dec. 7, 2021, the entire content of which is incorporated herein by reference.

TECHNICAL FIELD

The present disclosure relates to an optical connector and an optical connection structure.

BACKGROUND

Japanese Unexamined Patent Publication No. 2019-90974 discloses a technology of performing positional alignment between multicore optical fibers using guide pins. In this technology, end portions of a pair of guide pins on one side are respectively inserted into a pair of guide pin insertion holes provided on a tip surface of a ferrule, and end portions of the pair of guide pins on the other side are respectively inserted into a pair of guide pin insertion holes provided on a tip surface of a ferrule which is a connection target. Accordingly, positional alignment between multicore optical fibers (that is, positional alignment between a multicore optical fiber and another multicore optical fiber of a connection target) is performed.

SUMMARY

The present disclosure provides an optical connector. The optical connector includes a ferrule accommodating an optical fiber, and a housing covering an outer circumference of the ferrule. An outer circumferential surface of the ferrule has a recessed part or a projecting part for positioning extending in an optical axis direction of the optical fiber. The housing has a slit extending in the optical axis direction at a position corresponding to the recessed part or the projecting part of the ferrule.

The present disclosure provides an optical connection structure. The optical connection structure includes a ferrule accommodating an optical fiber, a housing covering an outer circumference of the ferrule, and an adaptor having an inner space for allowing the housing to be inserted therethrough. An outer circumferential surface of the ferrule has a recessed part or a projecting part for positioning extending in an optical axis direction of the optical fiber. The housing has a slit extending in the optical axis direction at a position corresponding to the recessed part or the projecting part of the ferrule. The adaptor has a projecting part or a recessed part engaging with the recessed part or the projecting part of the ferrule through the slit of the housing.

DETAILED DESCRIPTION

Figure 1:
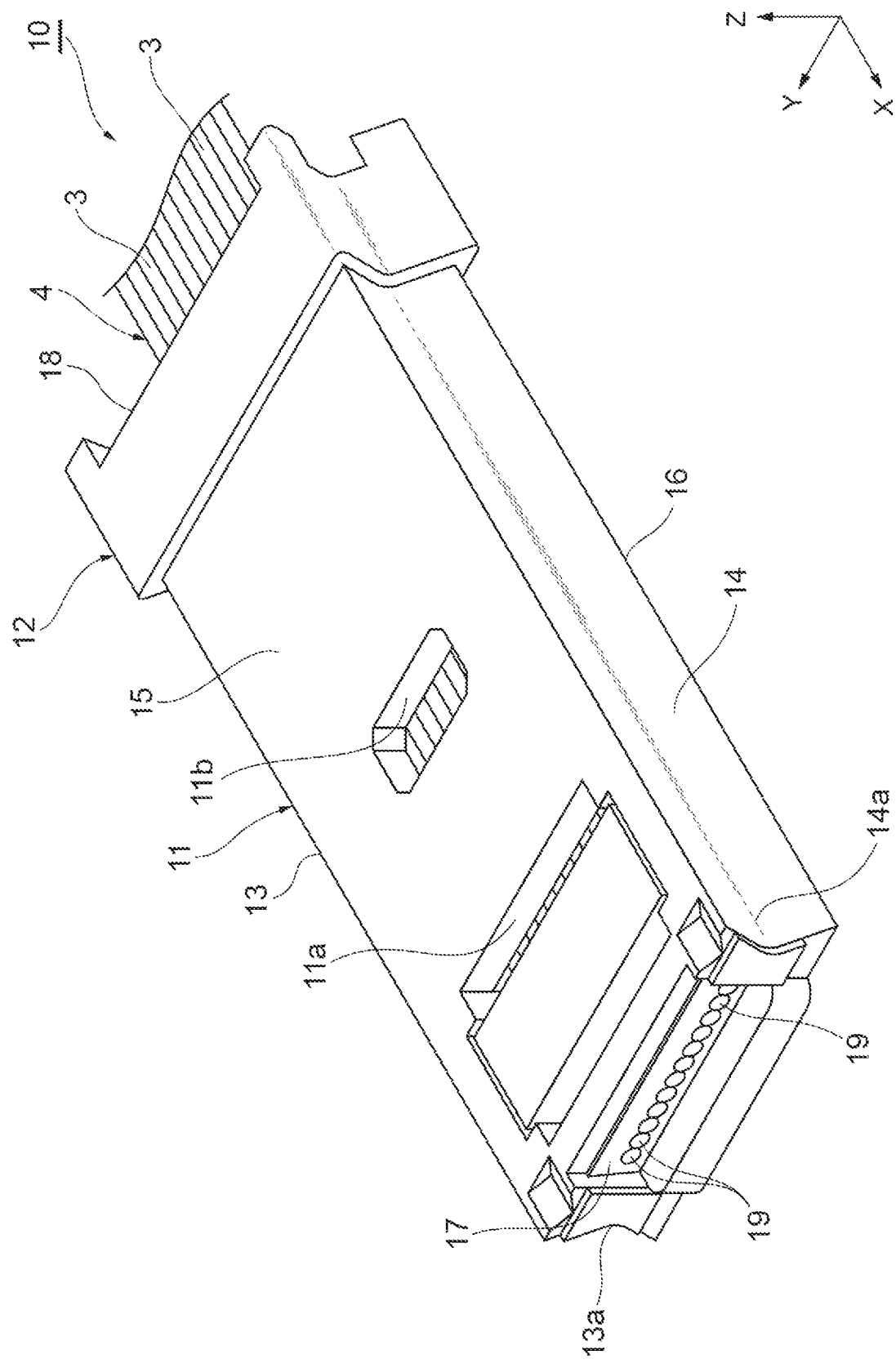
FIG. 1 is a perspective view illustrating a ferrule according to an embodiment.

Problem to be Solved by Present Disclosure

In the related art, guide pins having high dimensional accuracy are used such that clearances with respect to guide pin insertion holes are reduced as much as possible. For this reason, when guide pins are removed and inserted a plurality of times, there is concern that positioning accuracy may deteriorate due to damage to guide pin insertion holes.

Effects of Present Disclosure

According to the present disclosure, it is possible to provide an optical connector and an optical connection structure capable of simply performing positioning of a plurality of optical fibers.

Description of Embodiment of Present Disclosure

First, contents of an embodiment of the present disclosure will be listed and described. An optical connector according to the embodiment of the present disclosure includes a ferrule accommodating an optical fiber, and a housing covering an outer circumference of the ferrule. An outer circumferential surface of the ferrule has a recessed part or a projecting part for positioning extending in an optical axis direction of the optical fiber. The housing has a slit extending in the optical axis direction at a position corresponding to the recessed part or the projecting part of the ferrule.

In this optical connector, positioning of optical fibers is performed when the recessed part or the projecting part formed on the outer circumferential surface of the ferrule abuts the projecting part or the recessed part for positioning. A slit is formed in the housing covering the ferrule. The slit extends in the optical axis direction so as to correspond to the recessed part or the projecting part of the ferrule. Therefore, since the projecting part or the recessed part for positioning can abut the recessed part or the projecting part of the ferrule from an outward side of the housing through the slit, it is possible to simply perform positioning of a plurality of optical fibers.

The optical connector may further include a plurality of the optical fibers lined up in a direction intersecting the optical axis direction. The outer circumferential surface of the ferrule may include a first side surface and a second side surface facing each other in an arrangement direction of the plurality of the optical fibers. The recessed part or the projecting part may include a first recessed part or a first projecting part formed on the first side surface of the ferrule, and a second recessed part or a second projecting part formed on the second side surface. The housing may have a first side wall and a second side wall facing the first side surface and the second side surface. The slit may include a first slit formed in the first side wall of the housing and a second slit formed in the second side wall. In this constitution, since the first recessed part or the first projecting part and the second recessed part or the second projecting part utilized for positioning of the optical fibers face each other in the arrangement direction of the plurality of optical fibers, occurrence of positional misalignment in a direction intersecting the arrangement direction of the plurality of optical fibers is curbed.

A center position of the first slit and a center position of the first recessed part or the first projecting part may coincide with each other and a center position of the second slit and a center position of the second recessed part or the second projecting part may coincide with each other in a direction intersecting both the optical axis direction and the arrangement direction of the plurality of the optical fibers. In this constitution, the first recessed part or the first projecting part of the ferrule on the first side surface and the second recessed part or the second projecting part on the second side surface can be sandwiched in a perpendicular direction from the outward side of the slit of the housing.

A latch arm may be formed in one of the first side wall and the second side wall of the housing. In this constitution, for example, the housing can be easily fixed to an adaptor.

An optical connection structure according to another embodiment of the present disclosure includes a ferrule accommodating an optical fiber, a housing covering an outer circumference of the ferrule, and an adaptor having an inner space for allowing the housing to be inserted therethrough. An outer circumferential surface of the ferrule has a recessed part or a projecting part for positioning extending in an optical axis direction of the optical fiber. The housing has a slit extending in the optical axis direction at a position corresponding to the recessed part or the projecting part of the ferrule. The adaptor has a projecting part or a recessed part engaging with the recessed part or the projecting part of the ferrule through the slit of the housing.

In the optical connection structure, positioning of optical fibers is performed when the recessed part or the projecting part for positioning formed on the outer circumferential surface of the ferrule abuts the projecting part or the recessed part for positioning provided in the adaptor. A slit extending in the optical axis direction is formed in the housing covering the ferrule so as to correspond to the recessed part or the projecting part of the ferrule. Therefore, since the projecting part or the recessed part for positioning can abut the recessed part or the projecting part of the ferrule from an outward side of the housing through the slit, it is possible to simply perform positioning of a plurality of optical fibers.

The optical connection structure may further include a plurality of the optical fibers lined up in a direction intersecting the optical axis direction. The outer circumferential surface of the ferrule may include a first side surface and a second side surface facing each other in an arrangement direction of the plurality of the optical fibers. The recessed part or the projecting part of the ferrule may include a first recessed part or a first projecting part formed on the first side surface of the ferrule, and a second recessed part or a second projecting part formed on the second side surface. The projecting part or the recessed part of the adaptor may include a third projecting part or a third recessed part engaging with the first recessed part or the first projecting part, and a fourth projecting part or a fourth recessed part engaging with the second recessed part or the second projecting part. The adaptor may be elastically deformed such that the third projecting part or the third recessed part is directed in a direction in which the third projecting part or the third recessed part is separated from the fourth projecting part or the fourth recessed part of the adaptor when the third projecting part or the third recessed part engages with the first recessed part or the first projecting part of the ferrule. In this constitution, the ferrule can be favorably held by the adaptor.

The third projecting part or the third recessed part of the adaptor may include a partitioning wall partitioning the inner space. In this case, the inner space of the adaptor may be defined by a first wall body and a second wall body extending in an extending direction of the first side surface and the second side surface of the ferrule and facing each other, and a third wall body and a fourth wall body connecting the first wall body and the second wall body and facing each other. The partitioning wall may be formed between the third wall body and the fourth wall body. The partitioning wall may have a gap formed in the optical axis direction or a gap formed between the partitioning wall and either one of the third wall body and the fourth wall body. In this constitution, it is possible to easily form the third projecting part or the third recessed part which are elastically deformable. In addition, an influence of elastic deformation on the external appearance of the adaptor can be curbed.

The housing may have a latch arm. The adaptor may have an engagement portion engaging with the latch arm of the housing. In this constitution, the housing can be easily fixed to the adaptor.

Details of Embodiment of Present Disclosure

Hereinafter, with reference to the accompanying drawings, an embodiment of the present disclosure will be described in detail. In the following description, the same reference signs are used for the same elements or elements having the same function, and duplicate description will be omitted. In each diagram, in order to facilitate understanding, an XYZ orthogonal coordinate system is indicated. In each diagram, an extending direction of an optical fiber (optical axis direction) is an X direction, and an arrangement direction of the optical fiber is a Y direction. When the X direction (optical axis direction) is described as a forward-rearward direction, a tip side of the optical fiber becomes the front, and a side opposite thereto becomes the rear.

An optical connection structure according to an example includes an optical connector including a ferrule and a housing, and an adaptor allowing the optical connector to be inserted therethrough. FIG. 1 is a perspective view illustrating a ferrule according to an example. A ferrule 10 is attached to tip portions of an optical fiber ribbon 4. The optical fiber ribbon 4 accommodates a plurality of optical fibers 3. As illustrated in FIG. 1, the ferrule 10 is a member for holding each of the tip portions of the optical fibers 3 and optically coupling these optical fibers 3 to other optical fibers held in a different optical connector (refer to FIG. 6).

Each of the optical fibers 3 of the optical fiber ribbon 4 extends in the X direction. The respective optical fibers 3 of the optical fiber ribbon 4 are disposed in a manner of being lined up in the Y direction intersecting (for example, orthogonal to) the X direction. The optical fiber ribbon 4 may have a constitution having the plurality of optical fibers 3 disposed therein in an overlapping manner in a plurality of stages. The plurality of optical fibers 3 are held in a plurality of optical fiber grooves or a plurality of optical fiber holding holes formed inside the ferrule 10 by being disposed or inserted in the X direction.

Figure 4:
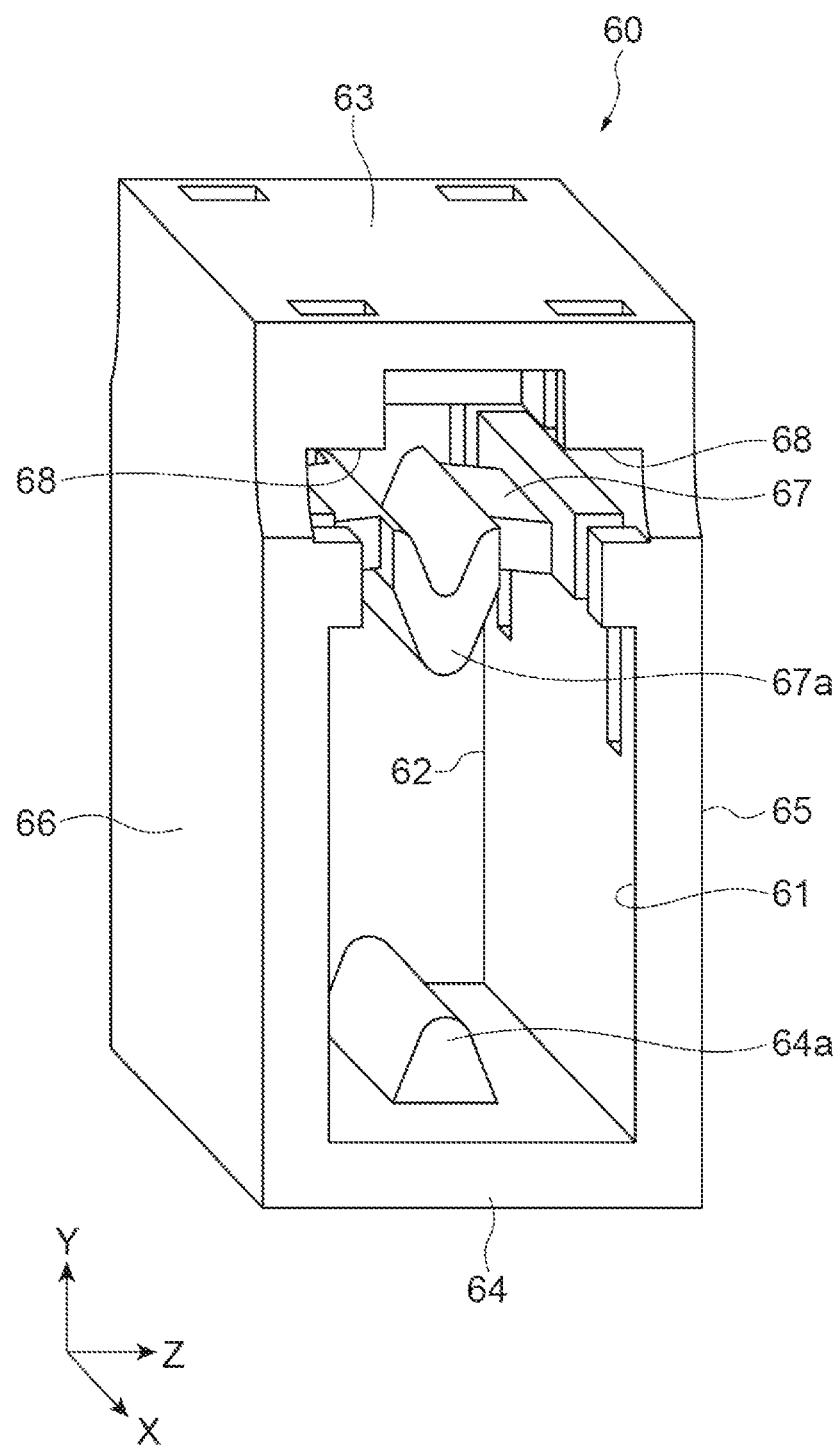
FIG. 4 is a perspective view illustrating an example of an adaptor constituting an optical connection structure.

An outer circumferential surface of the ferrule 10 according to an example has a positioning portion (for example, a recessed part) for relative positioning with respect to an adaptor 60 (refer to FIG. 4). This positioning portion extends in the optical axis direction of the optical fiber. The ferrule 10 illustrated in FIG. 1 includes a main body portion 11, a flange portion 12, side surfaces 13 and 14 (a first side surface and a second side surface), and recessed parts 13a and 14a (a first recessed part and a second recessed part) serving as positioning portions.

For example, the ferrule 10 is constituted using a material such as polyphenylene sulfide (PPS), polyetherimide (PEI), polycarbonate (PC), polymethyl methacrylate (PMMA), polymethyl methacrylate (PES), or cycloolefin polymer (COP). The ferrule 10 according to an example may be constituted using PEI.

The main body portion 11 is a part having a substantially rectangular parallelepiped-shaped external appearance. Window portions 11a and 11b opening toward the inside of the ferrule are provided on an upper surface of the main body portion 11. The optical fiber grooves extending in the Y direction and holding the plurality of optical fibers 3 are formed on an inward side of the window portion 11a. The main body portion 11 may hold a plurality of optical fibers by means of optical fiber holding holes having round hole shapes and extending in the Y direction in place of the optical fiber grooves. In addition, an accommodation portion (internal space) extending from an opening of a rear end portion 18 toward the optical fiber grooves is formed inside the main body portion 11. The tip portions of the optical fibers 3 inserted from the opening of the rear end portion 18 are disposed in the respective optical fiber grooves through the accommodation portion. Each of the optical fibers 3 is optically coupled to each lens 19 in a lens array provided in a tip portion 17. The lenses 19 are lined up in the Y direction.

The flange portion 12 is a part positioned at a rear end of the main body portion 11 in the X direction. In a cross-sectional shape along an XY plane, the external shape of the flange portion 12 is larger than the external shape of the main body portion 11. The position of the ferrule 10 in the X direction with respect to a housing 30 accommodating the ferrule 10 (refer to FIG. 2) is regulated due to a step formed by the flange portion 12.

The side surface 13 (first side surface) and the side surface 14 (second side surface) constitute the outer circumferential surface of the ferrule 10. Both the side surfaces 13 and 14 are side surfaces facing each other in the Y direction that is the arrangement direction of the plurality of optical fibers 3 in the main body portion 11. The recessed part 13a (first recessed part) is provided on the side surface 13 and the recessed part 14a (second recessed part) is provided on the side surface 14, respectively. For example, the recessed parts 13a and 14a are V-grooves or U-grooves extending in the X direction and function as guides when the ferrule 10 is inserted into and removed from the adaptor 60. The recessed parts 13a and 14a may not be formed in the flange portion 12 and may extend to the flange portion 12.

When the recessed parts 13a and 14a have V-groove-shaped cross sections, in a cross section perpendicular to the X direction, for example, an opening angle of the V-groove (that is, an angle formed by a pair of surfaces constituting the V-groove) may be 450 to 150° or may be 60° to 100°. As an example, the opening angle of the V-groove may be 90°. Bottom portions of the V-grooves constituting the recessed parts 13a and 14a may be rounded, for example, in a cross section perpendicular to the X direction. In addition, cross sections of the recessed parts 13a and 14a may have semicircular shapes as long as they have a constitution in which projecting parts of the adaptor 60 (which will be described below) can come into contact therewith and positioning can be performed.

The recessed parts 13a and 14a in the illustrated example extend in the X direction and are formed to have V-groove shapes having a Z direction as a width direction. In the width direction, positions in the middle of the recessed parts 13a and 14a having V-groove shapes coincide with positions in the middle of the side surfaces 13 and 14 in the width direction. That is, the deepest portions (bottom portions) of the recessed parts 13a and 14a are formed in the middle of the side surfaces 13 and 14 in the width direction.

A side surface 15 and a side surface 16 are side surfaces for connecting the side surface 13 and the side surface 14 and constitute the outer circumferential surface of the ferrule 10, similar to the side surface 13 and the side surface 14. The side surface 15 and the side surface 16 face each other in the Z direction intersecting (orthogonal to) both the extending direction of the optical fibers 3 and the arrangement direction of the optical fibers 3. In the illustrated example, the interval between the side surface 13 and the side surface 14 is larger than the interval between the side surface 15 and the side surface 16. That is, the width of the ferrule 10 in the Y direction is larger than the width in the Z direction.

Figure 2:
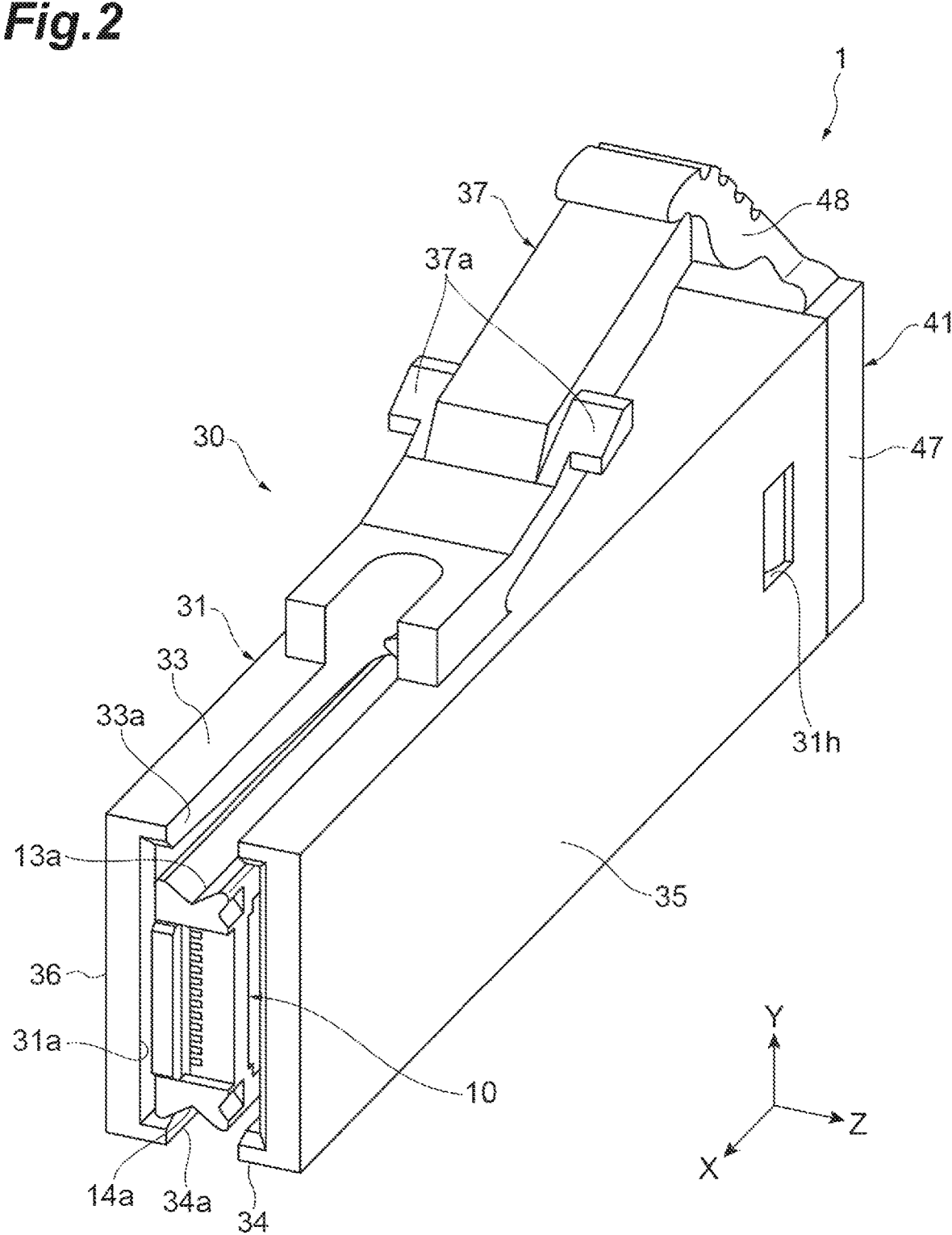
FIG. 2 is a perspective view illustrating an optical connector according to the embodiment.

FIG. 2 is a perspective view illustrating an optical connector 1 according to the embodiment. As illustrated in FIG. 2, the housing 30 covers an outer circumference of the ferrule 10. That is, the optical connector 1 includes the ferrule 10 and the housing 30 accommodating the ferrule 10. The housing 30 according to the present embodiment has slits extending in the optical axis direction at positions corresponding to the recessed parts 13a and 14a of the ferrule 10. Accordingly, the recessed parts 13a and 14a formed in the ferrule 10 are exposed to the outside of the housing 30 at the positions of the slits. That is, the recessed parts 13a and 14a can be visually recognized from the outward side of the optical connector 1.

For example, the housing 30 is constituted using an elastic material having elasticity, such as PEI, PBT, PPS, PC, PMMA, PES, or PA. In order to reduce the difference between a linear expansion coefficient of the material of the housing 30 and a linear expansion coefficient of the material of the ferrule 10, the same kind of material as that of the ferrule 10 may be used as the material of the housing 30.

The housing 30 includes a front housing 31 and a rear housing 41. For example, the front housing 31 has a substantially tubular shape having a substantially rectangular cross section and covers the side surface of the ferrule 10. That is, the front housing 31 has a side wall 33 (first side wall), a side wall 34 (second side wall), a side wall 35, and a side wall 36 respectively facing the side surface 13, the side surface 14, the side surface 15, and the side surface 16 of the ferrule 10. In addition, the front housing 31 includes an opening 31a formed at the front end in the X direction and an opening 31b formed at the rear end in the X direction (refer to FIG. 6).

As described above, slits for exposing the recessed parts 13a and 14a of the ferrule 10 accommodated therein to the outside are formed in the front housing 31. The slits according to an example include a slit 33a (first slit) formed in the side wall 33 and a slit 34a (second slit) formed in the side wall 34. The slit 33a is formed from the front end of the side wall 33 to the middle of the side wall 33 in the optical axis direction. The slit 34a is formed from the front end of the side wall 34 to the middle of the side wall 34 in the optical axis direction. In the Z direction, a center position of the slit 33a and a center position of the recessed part 13a coincide with each other. In the Z direction, a center position of the slit 34a and a center position of the recessed part 14a coincide with each other. Here, positions which coincide with each other do not need to strictly coincide with each other and include a range of an error due to machining accuracy, assembly accuracy, or the like of each member. In addition, in the Z direction, the size of the width of the slit 33a may be equal to or larger than the size of the width of the recessed part 13a. In the Z direction, the size of the width of the slit 34a may be equal to or larger than the size of the width of the recessed part 14a. According to an example, both the sizes of the widths of the slits 33a and 34a and both the sizes of the widths of the recessed parts 13a and 14a may be the same as each other. In this case, when viewed in the Y direction, the overall width of the recessed part 13a can be visually recognized through the slit 33a. In addition, when viewed in the Y direction, the overall width of the recessed part 14a can be visually recognized through the slit 34a.

A latch arm 37 including a latch 37a engaging with the adaptor 60 is provided in the side wall 33. The latch arm 37 according to an example is inclined such that it is separated from the side wall 33 toward the rear from the position of the rear end of the slit 33a. The latch 37a protrudes in a lateral direction (Z direction) from the position in the middle of the latch arm 37 in the forward-rearward direction.

The front housing 31 includes engagement portions 31h with which the rear housing 41 engages in side walls 35 and 36. As an example, the engagement portions 31h are engagement holes, and engagement portions 42h of the rear housing 41 (refer to FIG. 3) engage with these engagement holes.

Figure 3:
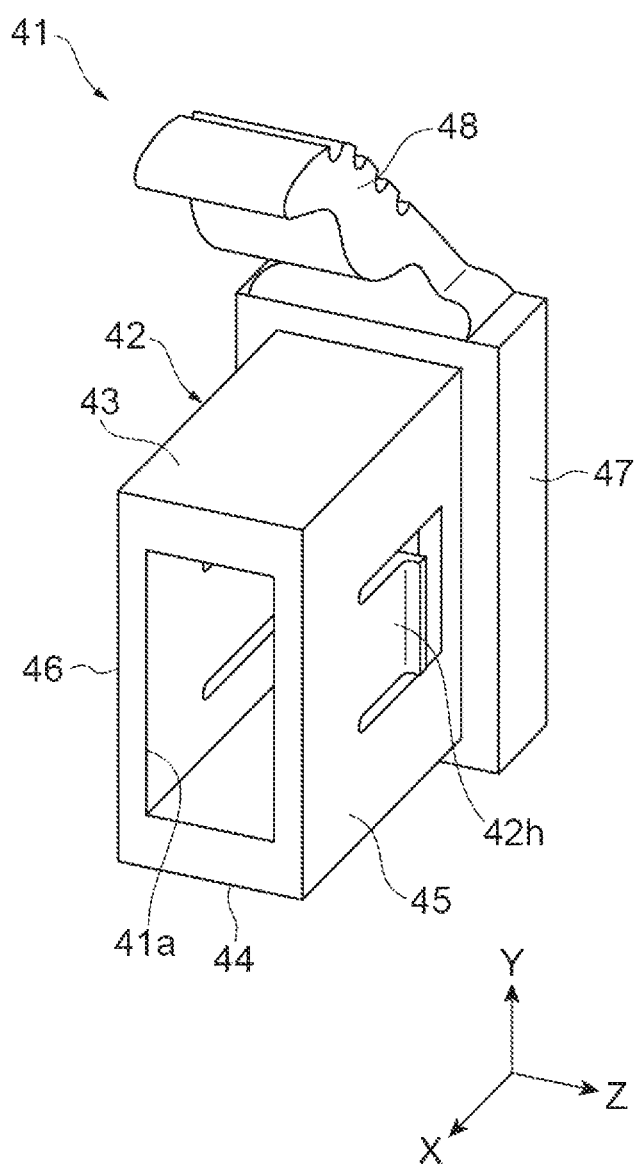
FIG. 3 is a perspective view illustrating a rear housing constituting the optical connector according to the embodiment.

FIG. 3 is a perspective view illustrating a rear housing. The rear housing 41 has an insertion portion 42 which is inserted into the front housing 31, an expansion portion 47 which expands at the rear end of the insertion portion 42, and an insertion hole 41a which penetrates the insertion portion 42 and the expansion portion 47 in the forward-rearward direction and through which the optical fiber ribbon 4 passes.

For example, the insertion portion 42 includes a side wall 43, a side wall 44, a side wall 45, and a side wall 46 respectively facing the side wall 33, the side wall 34, the side wall 35, and the side wall 36 of the front housing 31. The engagement portions 42h described above are respectively provided in the side walls 45 and 46. The engagement portions 42h in the illustrated example are formed by being cut out such that they are surrounded in three directions. Protrusions for engagement are formed at tips of the engagement portions 42h.

As illustrated in FIG. 2, in a state in which the rear housing 41 engages with the front housing 31, the expansion portion 47 abuts the rear end of the front housing 31. In addition, in a state in which the rear housing 41 engages with the front housing 31, a coil spring 49 (refer to FIG. 6) is disposed between the rear housing 41 and the ferrule 10. That is, the ferrule 10 is biased toward the front by the coil spring 49. The expansion portion 47 includes a protruding piece 48 obliquely protruding toward a tip of the latch arm 37 of the front housing 31. A tip of the protruding piece 48 abuts the tip of the latch arm 37 in a state of covering the tip of the latch arm 37. For example, this protruding piece 48 functions as a finger grip of the rear housing 41, and the latch arm 37 can be elastically deformed toward the side wall 33 by gripping the protruding piece 48.

Figure 5:
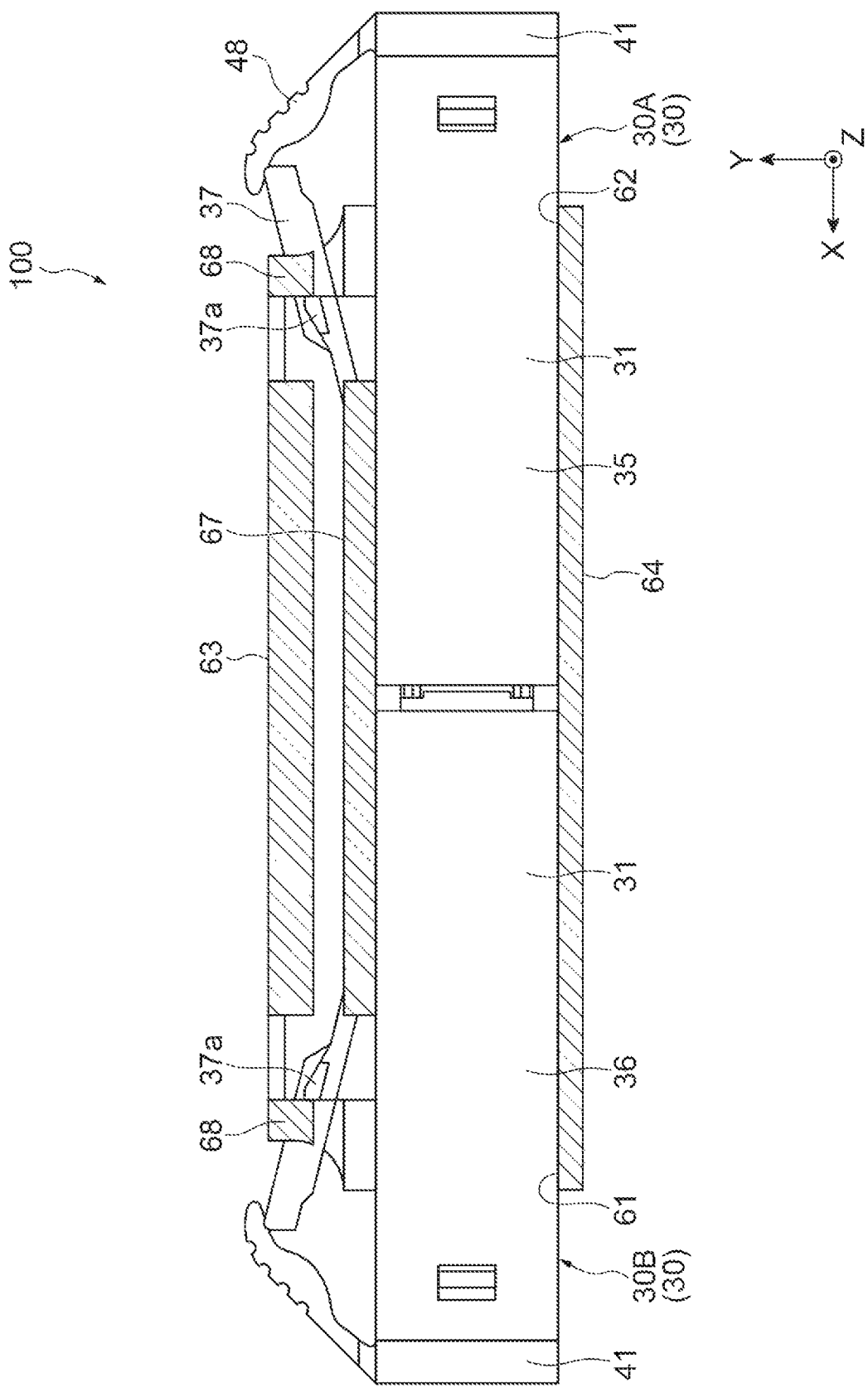
FIG. 5 is a cross-sectional view of the optical connection structure according to the embodiment cut in an optical axis direction.
Figure 6:
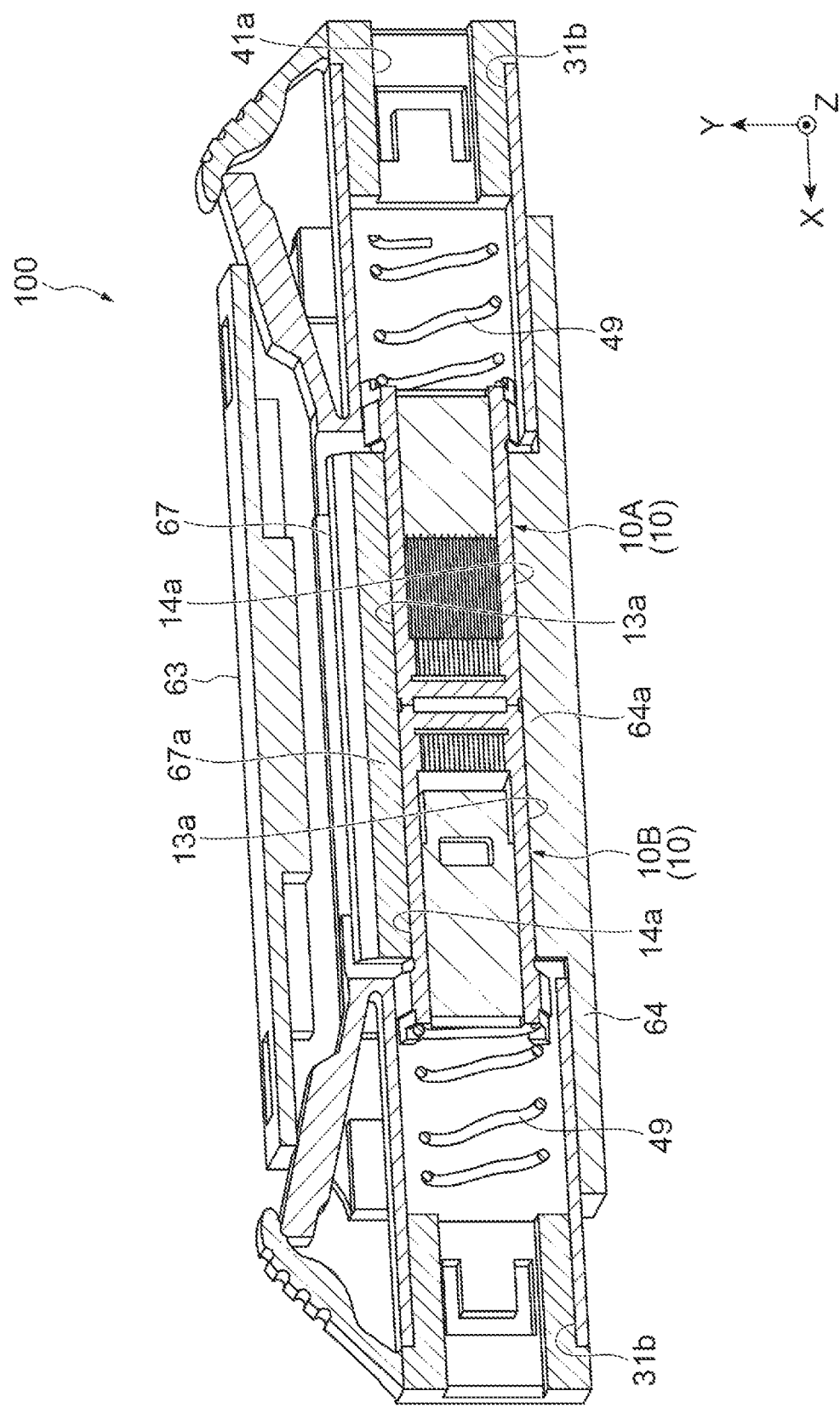
FIG. 6 is a cross-sectional perspective view of the optical connection structure according to the embodiment cut in the optical axis direction.
Figure 7:
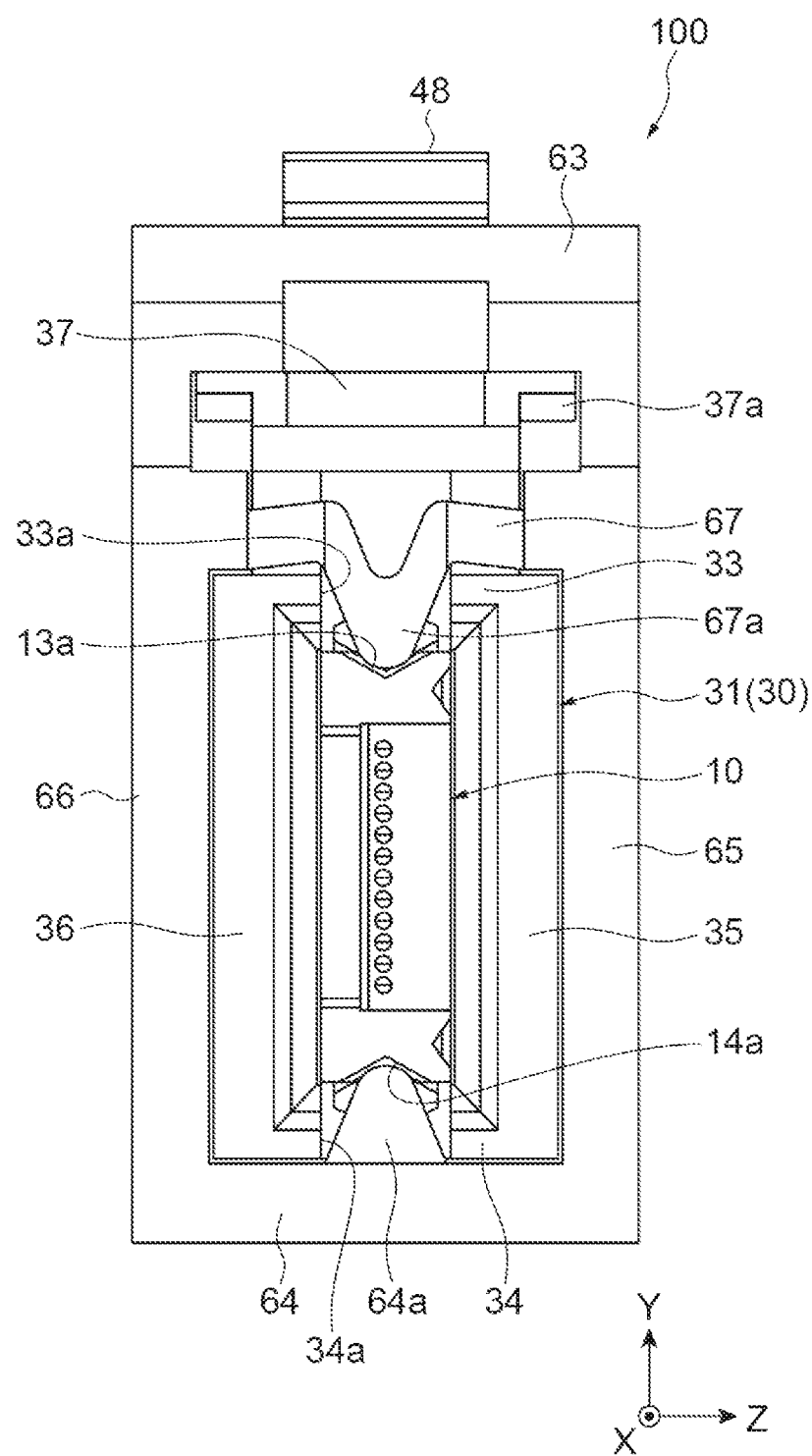
FIG. 7 is a view of the optical connection structure according to the embodiment viewed in the optical axis direction.

FIG. 4 is a perspective view illustrating an example of an adaptor constituting an optical connection structure. FIG. 5 is a cross-sectional view of the optical connection structure according to the embodiment cut in the optical axis direction. In FIG. 5, an optical connection structure 100 is cut along the side wall 35 or the side wall 36 of housings 30A and 30B. The housings 30A and 30B have the same constitution as the housing 30 described above. FIG. 6 is a cross-sectional perspective view of the optical connection structure according to the embodiment cut in the optical axis direction. In FIG. 6, the optical connection structure 100 is cut along an XY plane in the middle in the Z direction. FIG. 7 is a view of the optical connection structure according to the embodiment viewed in the optical axis direction.

The adaptor 60 is a tubular-shaped member for performing optical connection by holding a pair of ferrules 10A and 10B respectively accommodated in the housings 30A and 30B such that they face each other. For this reason, the adaptor 60 has an inner space through which the housing 30 is inserted. In addition, the adaptor 60 has projecting parts 67a and 64a engaging with the recessed parts 13a and 14a of the ferrule 10 through the slits 33a and 34a of the housing 30 inserted through the internal space. Accordingly, relative positions of the adaptor 60 and the ferrule 10 when viewed in the X direction are determined.

For example, the adaptor 60 is constituted using an elastic material having elasticity, such as PEI, PBT, PPS, PC, PMMA, PES, or PA. In order to reduce the difference between a linear expansion coefficient of the material of the adaptor 60 and a linear expansion coefficient of the material of the ferrules 10A and 10B, the same kind of material as those of the ferrules 10A and 10B may be used the material of the adaptor 60.

For example, the adaptor 60 has a substantially tubular shape having a substantially rectangular cross section. The adaptor 60 covers side surfaces of the housing 30 accommodating the ferrule 10. That is, the adaptor 60 has a wall body 63 (first wall body), a wall body 64 (second wall body), a wall body 65 (third wall body), and a wall body 66 (fourth wall body) respectively facing the side wall 33, the side wall 34, the side wall 35, and the side wall 36 of the housing 30 (refer to FIG. 4). The wall body 63 and the wall body 64 extend in the extending direction of the side surface 13 and the side surface 14 of the ferrule 10. The wall body 63 and the wall body 64 face each other. The wall body 65 and the wall body 66 connect the wall body 63 and the wall body 64 to each other. The wall body 65 and the wall body 66 face each other. In addition, the adaptor 60 includes a first opening 61 formed at the front end in the X direction and a second opening 62 formed at the rear end in the X direction. The adaptor 60 according to an example includes a partitioning wall 67 partitioning the inner space demarcated by the wall body 63, the wall body 64, the wall body 65, and the wall body 66. The partitioning wall 67 is formed to connect the wall body 65 and the wall body 66 to each other. Accordingly, the adaptor 60 includes the inner space demarcated by the wall body 63, the wall body 65, the wall body 66, and the partitioning wall 67, and the inner space demarcated by the wall body 64, the wall body 65, the wall body 66, and the partitioning wall 67.

The partitioning wall 67 is formed in the middle in the X direction along the wall body 63. That is, in the X direction, the partitioning wall 67 is not formed in the vicinity of the front end and in the vicinity of the rear end of the adaptor 60. Engagement portions 68 engaging with the latch arm 37 of the housing 30 are provided at the front end and the rear end of the adaptor 60. The engagement portions 68 may be protrusions protruding from the wall body 65 and the wall body 66 toward the inner space. The engagement portions 68 in the illustrated example are formed at upper ends of the wall body 65 and the wall body 66. For this reason, in other words, the engagement portions 68 protrude to the inner space from both ends of the front end and the rear end of the wall body 63 in the Z direction.

According to an example, regarding projecting parts engaging with the recessed parts 13a and 14a of the ferrule 10, the adaptor 60 includes a projecting part 67a engaging with the recessed part 13a, and a projecting part 64a engaging with the recessed part 14a. The projecting part 67a is formed on a surface of the partitioning wall 67 facing the wall body 64. That is, the projecting part 67a protrudes from the partitioning wall 67 toward the wall body 64. The projecting part 67a extends in the X direction. The projecting part 64a is formed on a surface of the wall body 64 facing the partitioning wall 67. That is, the projecting part 64a protrudes from the wall body 64 toward the partitioning wall 67. The projecting part 64a extends in the X direction. In this manner, the projecting part 67a and the projecting part 64a extend in the X direction and face each other in the Y direction.

In the optical connection structure 100, for example, the housing 30A accommodating the ferrule 10A is inserted into the adaptor 60 from the second opening 62, and the housing 30B accommodating the ferrule 10B is inserted into the adaptor 60 from the first opening 61. The adaptor 60 is fitted into the ferrules 10A and 10B such that the tip portion 17 of the ferrule 10A and the tip portion 17 of the ferrule 10B (connection target) face each other.

The projecting parts 67a and 64a engage with the recessed parts 13a and 14a of the ferrule 10 through the slits 33a and 34a of the housing 30 when the housing 30 accommodating the ferrule 10 is inserted into the adaptor 60. Accordingly, the projecting parts 67a and 64a guide insertion and removal of the ferrule 10 to the inside and the outside of the adaptor 60. In a no-load state, a distance from a tip of the projecting part 67a to a tip of the projecting part 64a in Y direction may be shorter than a distance from the recessed part 13a of the ferrule 10 to the recessed part 14a in Y direction. In this case, in a state in which the projecting parts 67a and 64a engage with the recessed parts 13a and 14a, the partitioning wall 67 may be elastically deformed such that the distance from the tip of the projecting part 67a to the tip of the projecting part 64a increases. In a state in which the projecting parts 67a and 64a engage with the recessed parts 13a and 14a, the wall body 64 may also be elastically deformed such that the distance from the tip of the projecting part 67a to the tip of the projecting part 64a increases. In this manner, in a state in which the ferrule 10 and the adaptor 60 engage with each other, one of or both the wall bodies (the partitioning wall 67 and wall body 64) sandwiching the ferrule 10 therebetween may be elastically deformed.

As described above, the optical connector 1 includes the ferrule 10 accommodating the optical fibers 3, and the housing 30 covering the outer circumference of the ferrule 10. The outer circumferential surface of the ferrule 10 has recessed parts (recessed parts 13a and 14a) as guides for positioning extending in the optical axis direction of the optical fibers 3. The housing 30 has slits (slits 33a and 34a) extending in the optical axis direction at positions corresponding to the recessed parts of the ferrule 10. Further, the optical connection structure 100 includes the ferrule 10 accommodating the optical fibers 3, the housing 30 covering the outer circumference of the ferrule 10, and the adaptor 60 having an inner space for allowing the housing 30 to be inserted therethrough. The adaptor 60 has projecting parts (projecting parts 67a and 64a) engaging with the recessed parts of the ferrule 10 through the slits of the housing 30.

In the optical connector 1 and the optical connection structure 100 described as above, positioning of the optical fibers 3 is performed by causing the recessed parts for positioning formed on the outer circumferential surface of the ferrule 10 to abut the projecting parts for positioning provided in the adaptor 60. The slits extending in the optical axis direction are formed in the housing 30 covering the ferrule 10 so as to correspond to the recessed parts of the ferrule 10. For this reason, the projecting parts for positioning can abut the recessed parts of the ferrule 10 from the outward side of the housing 30 through the slits. When the housing 30 accommodating the ferrule 10 is inserted into the adaptor 60, positioning of the ferrule 10 is performed by regulating the position of the ferrule 10 in the Y direction and the Z direction with respect to the adaptor 60 and each rotation about the center of each axis of the XYZ axes. As a result, there is no need to use a guide pin having high dimensional accuracy for positioning between the plurality of optical fibers 3. Therefore, positioning of the plurality of optical fibers 3 can be simply performed.

When a ferrule is accommodated in a housing, it is normally difficult to interlock a recessed part formed on a side surface of the ferrule by means of a projecting part of an adaptor. For example, it is conceivable to form a gap between the side surface of the ferrule and an inner surface of the housing and sandwich the recessed part of the ferrule therebetween by utilizing the gap. However, in this case, the cross-sectional area of the optical connector constituted by the housing and the ferrule increases by the amount corresponding to the formed gap. Consequently, the cross-sectional area of the optical connection constitution also increases. In the foregoing optical connection structure, by forming slits in the housing, not only the projecting parts 67a and 64a of the adaptor can be easily caused to abut the recessed parts 13a and 14a of the ferrule but also the cross-sectional areas of the optical connector 1 and the optical connection structure 100 can be reduced.

The outer circumferential surface of the ferrule 10 may include the side surface 13 and the side surface 14 (the first side surface and the second side surface) facing each other in the arrangement direction of the plurality of optical fibers 3, the recessed part 13a (first recessed part) formed on the side surface 13 of the ferrule 10, and the recessed part 14a (second recessed part) formed on the side surface 14; and the housing 30 may include the side wall 33 and the side wall 34 (the first side wall and the second side wall) facing the side surface 13 and the side surface 14, the slit 33a (first slit) formed in the side wall 33, and the slit 34a (second slit) formed in the side wall 34. In this constitution, since the recessed part 13a and the recessed part 14a utilized for positioning of the optical fibers 3 face each other in the arrangement direction of the plurality of optical fibers 3, occurrence of positional misalignment in a direction intersecting the arrangement direction of the plurality of optical fibers 3 is curbed.

In a direction intersecting both the optical axis direction and the arrangement direction of the plurality of optical fibers 3, the center position of the slit 33a and the center position of the recessed part 13a may coincide with each other and the center position of the slit 34a and the center position of the recessed part 14a may coincide with each other. In this constitution, the recessed part 13a on the first side surface and the recessed part 14a on the second side surface of the ferrule 10 can be sandwiched in a perpendicular direction from the outward sides of the slits of the housing 30.

The latch arm 37 may be formed in one of the side wall 33 and the side wall 34 of the housing 30. In this constitution, for example, the housing 30 can be easily fixed to the adaptor 60.

The adaptor 60 may be elastically deformed such that the projecting part 67a is directed in a direction in which it is separated from the projecting part 64a of the adaptor 60 when the projecting part 67a engages with the recessed part 13a of the ferrule 10. In this constitution, the ferrule 10 can be favorably held by the adaptor 60.

The projecting part 67a of the adaptor 60 is provided in the partitioning wall 67 partitioning the inner space. In this case, an influence of elastic deformation of the partitioning wall 67 on the external appearance of the adaptor 60 can be curbed.

The housing 30 may have a latch arm, and the adaptor 60 may have an engagement portion engaging with the latch arm of the housing 30. In this constitution, the housing 30 can be easily fixed to the adaptor 60.

Hereinabove, the optical connection structure according to the exemplary embodiment has been described. However, the present invention is not limited to the embodiment described above and can be suitably changed within a range not departing from the gist disclosed in the claims.

Figure 8:
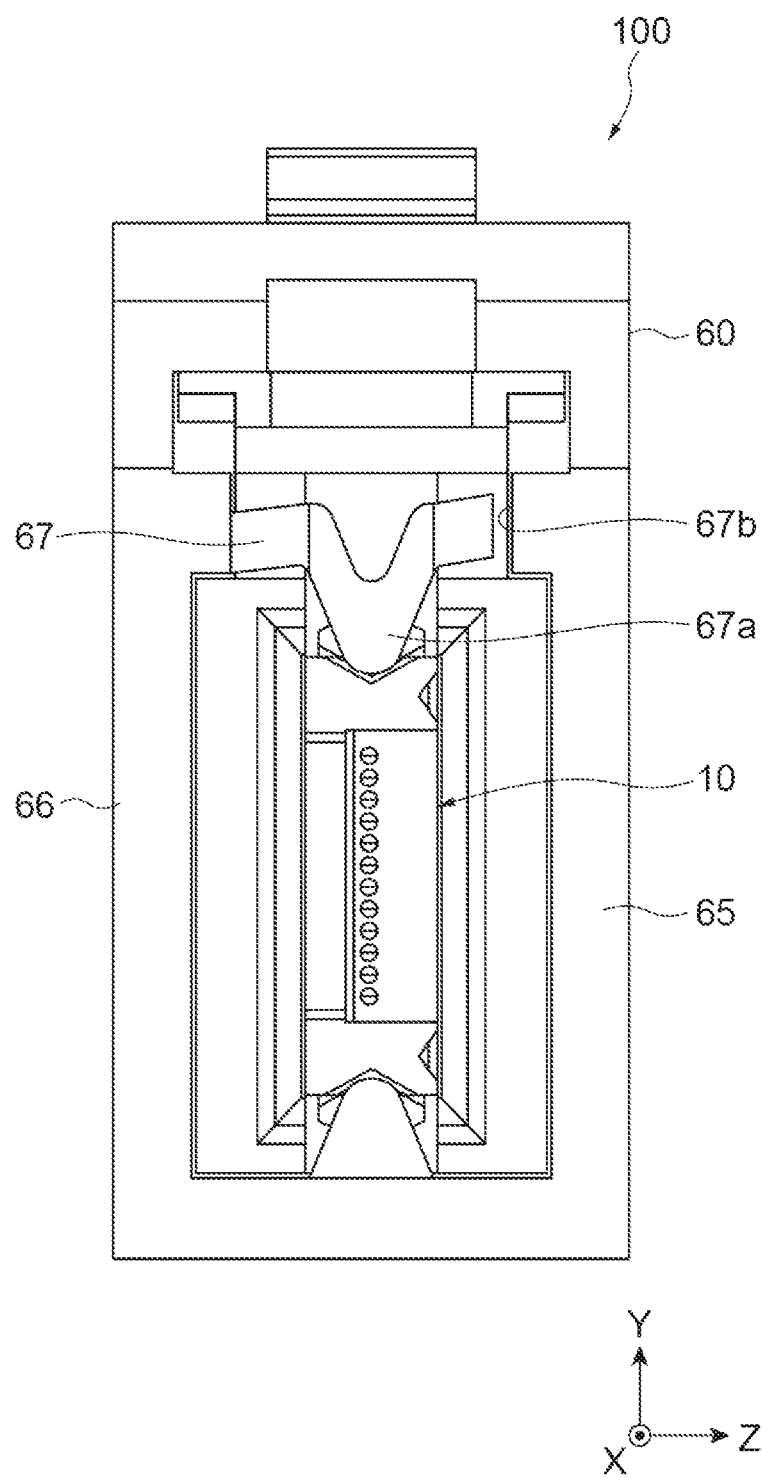
FIG. 8 is a view of an optical connection structure according to another embodiment viewed in the optical axis direction.

For example, an example in which a partitioning wall is formed to connect the wall body 65 and the wall body 66 to each other has been described. However, the constitution of the partitioning wall is not limited thereto. FIG. 8 is a view illustrating another form of the partitioning wall. As illustrated in FIG. 8, the partitioning wall 67 may be isolated from one of the wall body 65 and the wall body 66. In the illustrated example, the partitioning wall 67 is isolated from the wall body 65. A gap 67b extending in the X direction (optical axis direction) and the Y direction is formed between the partitioning wall 67 and the wall body 65. In this constitution, since elasticity of the partitioning wall 67 in which the projecting part 67a is formed can be easily adjusted, for example, an elastic deformation form of the partitioning wall 67 can be easily realized with a small force. The position of the gap 67b in the Z direction is not particularly limited. For example, the gap 67b may be formed at a position away from the wall body 65. That is, the gap 67b may be formed inside the partitioning wall 67. In this case, the partitioning wall 67 is constituted of a part extending from one of the wall body 65 and the wall body 66 and a part including the projecting part 67a extending from the other of the wall body 65 and the wall body 66.

In the foregoing embodiment, the recessed parts 13a and 14a (grooves) are formed on the side surfaces 13 and 14 of the ferrule 10, and the projecting parts 67a and 64a are formed on the inner surface of the adaptor 60. When the projecting parts 67a and 64a enter the recessed parts 13a and 14a, positioning of the ferrule 10 is performed with respect to the adaptor 60. However, in contrast, the ferrule 10 may be inserted into the adaptor 60 by forming the projecting parts (the first projecting part and the second projecting part) on the side surfaces 13 and 14 of the ferrule 10 and providing the recessed parts (grooves) (the third recessed part and the fourth recessed part) on the inner surface of the adaptor 60. In this case, the projecting parts formed on the side surfaces 13 and 14 of the ferrule 10 may have shapes similar to those of the projecting parts 67a and 64a of the adaptor 60, or they may have semicircular protrusion shapes or elliptical protrusion shapes. The recessed parts formed on the inner surface of the adaptor 60 may have shapes similar to those of the recessed parts 13a and 14a (V-grooves, U-grooves, or the like) formed on the side surfaces 13 and 14 of the ferrule 10.

In the foregoing embodiment, for example, the adaptor 60 is constituted using an elastic material. However, the adaptor 60 may be constituted using a material which is not elastically deformed (or a material which is not substantially elastically deformed). In this case, the distance between the bottom portions of the recessed parts 13a and 14a of the ferrule 10 may be the same or slightly narrower than the distance between the tips of the projecting parts 67a and 64a of the adaptor 60.

An example in which one partitioning wall is formed in the inner space of the adaptor has been described. However, for example, two partitioning walls may be formed in the internal space of the adaptor. In this case, positioning of the ferrule may be performed by a pair of projecting parts respectively provided in a pair of partitioning walls. In a state in which positioning of the ferrule is performed by the pair of partitioning walls, the pair of partitioning walls may be elastically deformed.

What is claimed is:

1. An optical connector comprising:
a ferrule accommodating a plurality of optical fibers lined up in a direction intersecting an optical axis direction; and
a housing covering an outer circumference of the ferrule, wherein:
an outer circumferential surface of the ferrule has a recessed part or a projecting part for positioning extending in the optical axis direction,
the housing has a slit extending in the optical axis direction at a position corresponding to the recessed part or the projecting part of the ferrule,
the outer circumferential surface of the ferrule includes a first side surface and a second side surface facing each other in an arrangement direction of the plurality of the optical fibers,
the recessed part or the projecting part includes a first recessed part or a first projecting part formed on the first side surface of the ferrule, and a second recessed part or a second projecting part formed on the second side surface,
the housing has a first side wall and a second side wall facing the first side surface and the second side surface,
the slit includes a first slit formed in the first side wall of the housing and a second slit formed in the second side wall, and
a latch arm is formed in one of the first side wall and the second side wall of the housing.

2. The optical connector according to claim 1,
wherein a center position of the first slit and a center position of the first recessed part or the first projecting part coincide with each other and a center position of the second slit and a center position of the second recessed part or the second projecting part coincide with each other in a direction intersecting both the optical axis direction and the arrangement direction of the plurality of the optical fibers.

3. An optical connection structure comprising:
a ferrule accommodating an optical fiber;
a housing covering an outer circumference of the ferrule; and
an adaptor having an inner space for allowing the housing to be inserted therethrough, wherein an outer circumferential surface of the ferrule has a recessed part or a projecting part for positioning extending in an optical axis direction of the optical fiber, wherein the housing has a slit extending in the optical axis direction at a position corresponding to the recessed part or the projecting part of the ferrule, and wherein the adaptor has a projecting part or a recessed part engaging with the recessed part or the projecting part of the ferrule through the slit of the housing.

4. The optical connection structure according to claim 3 further comprising:

a plurality of the optical fibers lined up in a direction intersecting the optical axis direction, wherein the outer circumferential surface of the ferrule includes a first side surface and a second side surface facing each other in an arrangement direction of the plurality of the optical fibers, wherein the recessed part or the projecting part of the ferrule includes a first recessed part or a first projecting part formed on the first side surface of the ferrule, and a second recessed part or a second projecting part formed on the second side surface, wherein the projecting part or the recessed part of the adaptor includes a third projecting part or a third recessed part engaging with the first recessed part or the first projecting part, and a fourth projecting part or a fourth recessed part engaging with the second recessed part or the second projecting part, and wherein the adaptor is elastically deformed such that the third projecting part or the third recessed part is directed in a direction in which the third projecting part or the third recessed part is separated from the fourth projecting part or the fourth recessed part of the adaptor when the third projecting part or the third recessed part engages with the first recessed part or the first projecting part of the ferrule.

5. The optical connection structure according to claim 4, wherein the third projecting part or the third recessed part of the adaptor is provided in a partitioning wall partitioning the inner space.

6. The optical connection structure according to claim 5, wherein the inner space of the adaptor is defined by a first wall body and a second wall body extending in an extending direction of the first side surface and the second side surface of the ferrule and facing each other, and a third wall body and a fourth wall body connecting the first wall body and the second wall body and facing each other, and wherein the partitioning wall
is formed between the third wall body and the fourth wall body, and
has a gap formed in the optical axis direction or a gap formed between the partitioning wall and either one of the third wall body and the fourth wall body.

7. The optical connection structure according to claim 3, wherein the housing has a latch arm, and wherein the adaptor has an engagement portion engaging with the latch arm of the housing.

* * * * *